United States Patent [19]

Furia et al.

[11] Patent Number: 4,557,117
[45] Date of Patent: Dec. 10, 1985

[54] MACHINE FOR PRODUCING AND DISPENSING ICE-LOLLIES AND THE LIKE

[76] Inventors: Edoardo Furia, Via Volterrana 86-Loc., La Romola, San Casciano V/Pesa, Firenze, Italy, 50020; Carlo La Corte, Località Falconcello, Asciano, Siena, Italy, 53041

[21] Appl. No.: 633,899

[22] Filed: Jul. 24, 1984

[30] Foreign Application Priority Data

Jul. 26, 1983 [IT] Italy .................................. 9485 A/83

[51] Int. Cl.[4] .............................. F25C 1/22; B65B 5/04
[52] U.S. Cl. ................................... 62/340; 425/126 S; 426/421; 426/515
[58] Field of Search ............... 426/515, 134, 100, 421, 426/524; 425/126 S; 62/340

[56] References Cited

U.S. PATENT DOCUMENTS

| 2,123,215 | 7/1938 | Thomas | 426/421 |
|---|---|---|---|
| 3,366,077 | 1/1968 | Gardner | 426/515 |
| 4,104,411 | 8/1978 | Pooler | 426/421 |
| 4,413,461 | 11/1983 | Waldstrom | 425/126 S |

Primary Examiner—George Yeung
Attorney, Agent, or Firm—Hopgood, Calimafde, Kalil, Blaustein & Judlowe

[57] ABSTRACT

An automatic coin-fed ice-lolly producing and dispensing machine comprises an ice-lolly mould in two parts (9A,9B) kept at a freezing temperature by a refrigeration plant; a controlled supply of pre-cooled syrups (from 17); and apparatus for separating the product from the mould by inducing one part (9A) to move (f9) relative to the other (9B). The product then either drops out of the tilted mould, or is lifted by its stick (15).

12 Claims, 6 Drawing Figures

MACHINE FOR PRODUCING AND DISPENSING ICE-LOLLIES AND THE LIKE

BACKGROUND OF THE INVENTION

The invention relates to machinery for the production of ice-lollies, ice-creams and the like.

In modern systems for the production of ice-lollies (by means of water enriched with flavours, sweeteners and colouring materials) and of ice-creams (by means of fruit juices) or the like, moulds are cooled in a brine bath for a time sufficient to achieve the freezing of their contents (about 10 minutes) while a wooden stick, for supporting the product during consumption, is kept in a central position in the mould. The freezing is such that a snowy, compact, but compressible mass is formed. Then the mould is removed from the brine and dipped in warm water, or in some way heated, to help the detachment of the product. The product is wrapped in paper, boxed, packaged and stored in a freezer for subsequent distribution, being kept in cold surroundings all the time.

At the industrial level, automatic, continuous-cycle machines are known, which are usually equipped with a continuous belt carrying a plurality of moulds. The belt runs first below a liquid-distributor and dispenser device as well as a wooden sticks loader and is then dipped in brine at $-12°$ to $-30°$ C. for the necessary time; on coming out of the brine, the belt winds around a terminal transmission roller and is heated up in order to discharge—as soon as it has turned under the roller—the ice-lollies, thus produced, into a container. The ice-lollies are immediately taken out, to prevent their joining together, collected in insulating boxes and stowed in freezer stores.

To reach the consumer, the boxes must be drawn out, loaded in freezer lorries, and delivered to the dealer, who, in turn, has to preserve them in a freezer until they are sold.

It will be readily seen that the cost of the necessary raw material (syrup or fruit juice) is insignificant (not higher than 15% of the final selling price) when compared with the huge energy expences of producing, packaging, transporting and preserving the frozen products over a considerable time. In particular it can easily be demonstrated that the economic budget is subdivided as follows: 33% to the production, 33% to the distribution and preservation, and 33% to the seller, all being referred to the selling price.

Moreover, during the preservation time, the product undergoes an "ageing" from the inevitable changes of temperature, which bring about an increase in the sugar concentration on its surface, giving rise to a sticky, unpalatable layer upon opening the envelope containing the refreshment.

On the other hand, the final sellers have some problems arising from supply and difficulties over the variety of flavours, which often lead to sale losses and the need to preserve unsold goods for a long time.

The object of the present invention is to avoid the above-mentioned drawbacks due both to energy production costs and to distribution and ageing. Objects and advantages will be apparent from the following text.

BRIEF SUMMARY OF THE INVENTION

The invention consists in a machine for producing ice-lollies, ice-creams and the like, comprising a mould capable of inducing mechanical compression stresses on the body surface zones of an ice-lolly formed in the mould by cooling, to provoke its detachment from the mould faces for the removal of the formed piece; and means for keeping the mould at a low temperature throughout a production cycle.

In a method according to the invention of producing ice-lollies, ice-creams and the like, in a refrigeration plant having a mould defining the shape of the product, a production cycle comprises: freezing, in the mould, ingredients for the product; using the mould to induce mechanical compression stresses on the body surface zones of its frozen contents; and removing the product thus detached from the mould; while keeping the mould at a freezing temperature throughout the production cycle.

DESCRIPTION OF THE DRAWINGS

In order that the invention may be better understood, several preferred embodiments will now be described, by way of example, with reference to the accompanying drawings, wherein.

DESCRIPTION OF THE PREFERRED EMBODIMENTS

Figure 1:
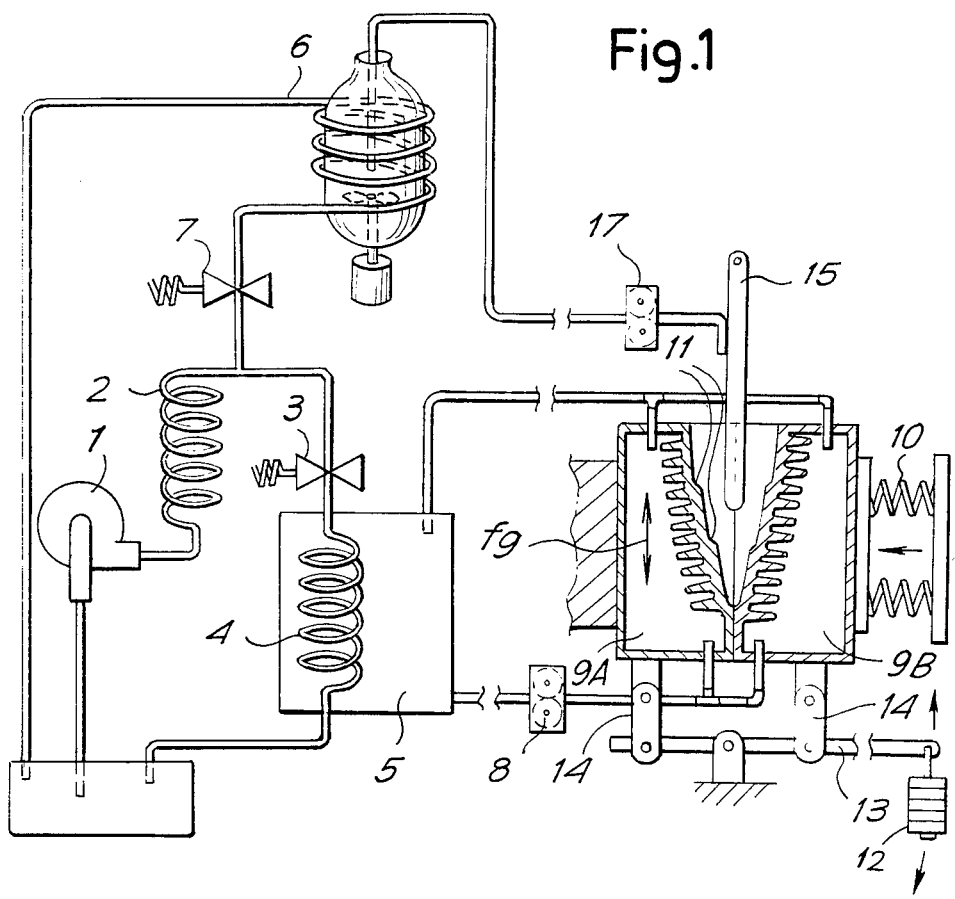
FIG. 1 is a diagram of a plant according to a first embodiment of the invention.
Figure 2:
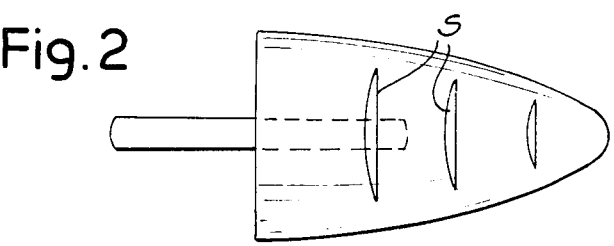
FIGS. 2 and 3 illustrate suitable shapes for an ice-cream or ice-lolly body to be produced in the embodiment of FIG. 1.
Figure 3:
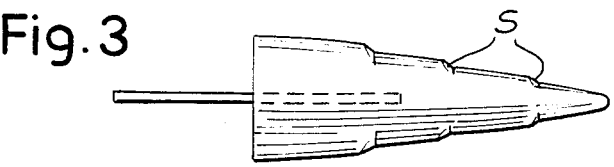

An automatic machine, as shown in FIG. 1, includes a freezing plant which comprises: a compressor 1, a radiator 2, an expansion valve 3 with thermostat, a cooling coil 4 to freeze the brine in a container 5 and—to pre-freeze the syrups—a coil 6 and an expansion valve 7. A circulation pump 8 circulates the brine to cool moulds 9A,9B. The or each mould is in two halves 9A and 9B, is kept closed by elastic means 10, and may be opened to let the piece drop out. The moulds present cavities for the coolant circulation; the surface in contact with the brine is suitably finned to increase the surface area of contact between the refrigeration fluid and the mould and thus to reduce the cooling period. The opposite cavities—which define the mould—are advantageously provided with steps 11 to help the detachment of the ice-lolly as will be illustrated hereinafter; these steps form steps S in the ice-lolly or ice-cream (FIGS. 2,3). The mould is open upwards for filling, and also for the withdrawal of the product where withdrawal under gravity is not provided. Suitable means are provided for the earlier introduction of a stick 15—made of wood or plastics—to hold the ice-lolly during consumption and where necessary also to draw it out by mechanical means (not shown), as soon as its detachment from the mould has been completed, in order for it to be discharged into a suitable container for distribution. The ice-lolly may alternatively be discharged simply under gravity by tilting the mould.

As soon as the mould contents reach the solid state, the pressure on the elastic means 10 is reduced and the mould halves 9A, 9B are moved slightly in the two directions indicated by arrows f9 by way of a piston system 12 (or a similar element) which, as illustrated, operates through a lever 13 and link rods 14. The movement is in opposite directions for the two mould parts, so that steps 11 each time act on the frozen mass by compressing it and then causing its detachment from the mould by mechanical compression stress. In the embodiment of FIG. 1 the solution is achieved with vertical movement i.e. with movement along the main axis of the ice-cream or ice-lolly body, the motion being imposed on the two semi-moulds; it is also possible to provide a fixed and a mobile part of the mould.

According to a different embodiment, the relative movement may be in a direction at right angles to that illustrated in FIG. 1, and in this case the steps 11 are not necessary.

Figure 4:
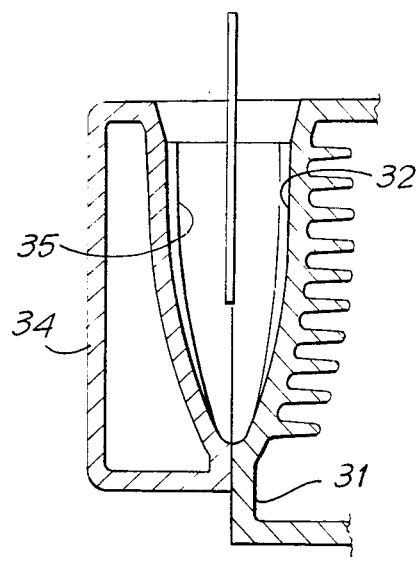
FIGS. 4 and 5 show in vertical and horizontal section a different embodiment of the ice-lolly or ice-cream mould.
Figure 5:
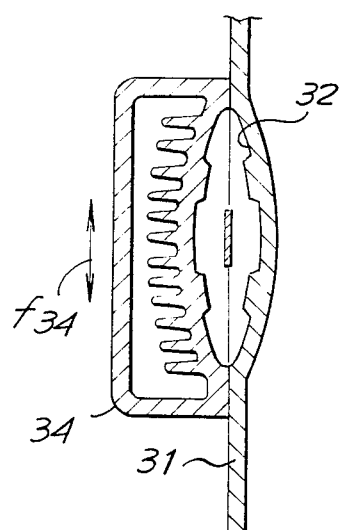

In a different embodiment, illustrated in FIGS. 4 and 5, a part 31 of a mould has a plurality of cavities 32 each forming a semi-mould while other mould parts 34 each define a complementary cavity 35 opposite one of the semi-moulds 32; in this case, the parts 34 move transversely, according to arrows f34, thus causing compressions of the frozen mass and its detachment from the mould in a similar way.

Figure 6:
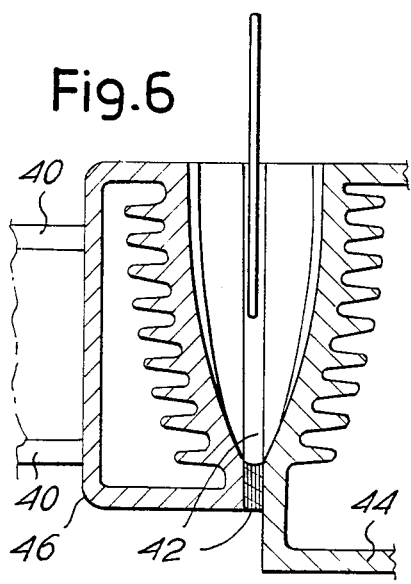
FIG. 6 shows a further embodiment of the mould.

With reference to FIG. 6, which shows a further embodiment of the mould, to help the detachment of the product from the mould, a side overpressure is applied by means of thrust members 40, so as to overcome the elasticity of a gasket 42 interposed between the two mould halves 44,46. In this way the volume of the already frozen product is slightly reduced and the product moves away instantaneously from the two mould halves.

According to a further embodiment (not shown) at least a portion of the mould surface is deformable, or movable in some way, so as to cause a volume reduction and thus a compaction of the snowy mass.

Alternatively, the two mould halves may be connected to a vibrating apparatus, again to help the detachment by surface compression.

Moreover, the two mould parts may be given a relative circular motion in their contact plane. The parts 34 could conceivably be given any relative motion in a closed trajectory in the coupling or sliding plane.

Any of the arrangements indicated above may be used in combination.

Once the detachment has taken place, the mould may open downwards, to permit the product to fall out and to be suitably channelled, preferably presenting its stick outwards, into a small box for the distribution of the product just frozen, and ready to be tasted. The withdrawal may alternatively be accomplished from the top and open part of the mould, without having the two parts separated.

Suitable means will be provided to supply syrups or other ingredients into the moulds, either according to a personal choice each time, or by assigning a syrup container for each mould or set of moulds.

More moulds may be made to operate simultaneously or individually on request.

A stirrer of known type serves to keep the liquid in uniform solution in each container; a batch dispenser device 17, also of known type, provides for the filling of the mould at the start of every cycle.

The cycle may be started by introducing a coin or a token into the distributing machine, or by means of a coin-box; it is thus possible to provoke the drop and the delivery of the ice-lolly or ice-cream and the consequent start of a new cycle for the formation of another ice-lolly or ice-cream in the emptied mould.

In order to meet the consumer's requirements more tanks may be provided containing syrups of different flavours selectable by a suitable push button or handle, and each syrup being useable in one or more moulds. Moreover, in order to reduce the waiting time there may be provided multiple but independent moulds (for example three) in such a manner as to constitute a supply of three ice-lollies, always ready for distribution. The production cycle is then started automatically when one of the moulds is available. The standby ice-lolly may remain in the mould or in a separate waiting position. Upon the introduction of the token or the coin the movement may be started for the detachment of one of the ready ice-lollies and either the discharge of the ice-lolly into the distributor or, alternatively, the provision of access for the withdrawal of the ice-lolly, and the dropping of the ice-lolly. The formation of another ice-lolly may then take place.

The machine may also work with one or more groups each including one or more moulds; and a suitable programme may be preset to store orders and to cause a properly programmed execution based on the instantaneous requirements.

The consumer's curiosity will still be satisfied, since, as soon as he has taken out an ice-lolly, he may attend the production operations of a new one.

It is obvious that in case of continuous withdrawal of the products, it will be necessary to wait for a certain time necessary for the formation of an ice-lolly. This time is reduced to the minimum by means of:
1. Pre-cooling the syrups to about plus 4° C., which helps their hygienic preservation besides reducing their cooling time in the mould;
2. Continuous mould cooling without any changes of temperature;
3. Internal finning of the moulds, to improve thermal exchanges;
4. Forced brine circulation at $-14°$ to $-30°$ C.;
5. Instantaneous mechanical detachment of the ice-lolly.

In particular, the successive heating and re-cooling of the moulds is avoided, with energy savings and simplification of the machine construction.

In order to make more tolerable the possible waiting time, slides, music, animated cartoons, electronic games or other pastimes may be added to the machine.

Finally, the automatic distribution may be combined with a dexterity or chance game of a known type.

We claim:

1. An apparatus for producing moulded frozen confections and facilitating disengagement of the frozen confections therefrom, comprising:

a first mould-defining member with a first substantially concave mould surface of predetermined dimensions, a second mould-defining member with a second substantially concave mould surface of predetermined dimensions, means for supporting said first and second mould-defining members in an adjacent relationship in a moulding position, at least one of said mould-defining members being movably supported, said first mould surface being in a facing relationship with said second mould surface in said moulding position, thereby defining a mould volume of predetermined dimensions wherein each portion of said first mould surface directly opposes a portion of said second mould surface, means for supplying a mouldable confection mix to said mould volume in said moulding position so that said confection mix is in contact with said first and second mould surfaces and assumes the shape of said mould volume in said moulding position, means for cooling said first and second mould defining members so that said confection mix freezes and retains the shape of said mould volume in said moulding position, forming a frozen confection of well-defined dimensions in contact with said mould surfaces, means for imparting a slight relative motion to said first and second mould-defining members mechanically coupled to said means for movably supporting at least one of said members, said support means, said surfaces and said means for imparting a relative motion to said mould-defining members being positioned, configured and dimensioned to cooperate so as to maintain said first and second mould surfaces in a facing relationship as said mould-defining members are relatively displaced from said moulding position during said relative motion and, upon displacement from said moulding position, to decrease the distance between at least a portion of said first mould surface and the portion of said second mould surface directly opposed thereto, whereby said frozen confection is subjected to a compressive mechanical stress which facilitates disengagement of said frozen confection from said mould surfaces.

2. The apparatus according to claim 1, wherein said means for cooling said first and second mould-defining members are operative to continuously cool said mould-defining members throughout a production cycle so that the mould is continuously maintained at a low temperature.

3. The apparatus according to claim 2, wherein said means for supplying said mouldable confection mix comprise means for supplying a liquid confection mix.

4. The apparatus according to claim 3, wherein said means for supplying a liquid confection mix comprise a tank provided with stirring means.

5. The apparatus according to claim 1, wherein each of said mould-defining members further define at least one step on each of said mould surfaces.

6. The apparatus according to claim 1, wherein said mould-defining members are substantially planar about the peripheral portions of said concave mould surfaces and are substantially adjacently disposed about a coupling plane defined by said peripheral portions in said moulding position.

7. The apparatus according to claim 6, further comprising a compressible gasket disposed between said mould-defining members.

8. The apparatus according to claim 7, wherein said means for imparting a slight relative motion to said mould-defining members are positioned, configured and dimensioned so that said relative motion of said mould-defining members is perpendicular to said coupling plane, thereby subjecting a moulded confection formed in said mould volume to a compressive stress.

9. The apparatus according to claim 8, wherein each of said mould-defining members includes means for receiving a cooling fluid and said mould surfaces have associated therewith cooling fins to enhance the cooling thereof.

10. The apparatus according to claim 6, wherein each of said mould-defining members define at least one gripping portion integral with said mould surface and said means for imparting a slight relative motion to said mould-defining members are positioned, configured, and dimensioned so that said slight relative motion of said mould-defining members is a sliding relative motion in said coupling plane.

11. The apparatus according to claim 10, wherein said gripping portions comprise a plurality of gripping members protuding inwardly with respect to said mould volume, said gripping members cooperating to define distinct zones of said mould volume, the dimensions of said distinct zones of said mould volume being necessarily altered during said sliding relative motion of said mould-defining members in said coupling plane.

12. The apparatus according to claim 11, wherein each of said mould-defining members includes means for receiving a cooling fluid and said mould surfaces have associated therewith cooling fins to enhance the cooling thereof.

* * * * *